3,328,267
SEPARATION OF o-XYLENE AND STYRENE BY DISTILLATION WITH A DIALKYLFORMAMIDE
Hans-Joachim Müller, Leverkusen, Germany, assignor to Erdolchemie Gesellschaft mit beschrankter Haftung, Leverkusen, Germany, a corporation of Germany
Filed Mar. 3, 1964, Ser. No. 349,172
Claims priority, application Germany, Mar. 12, 1963, E 24,471
7 Claims. (Cl. 203—43)

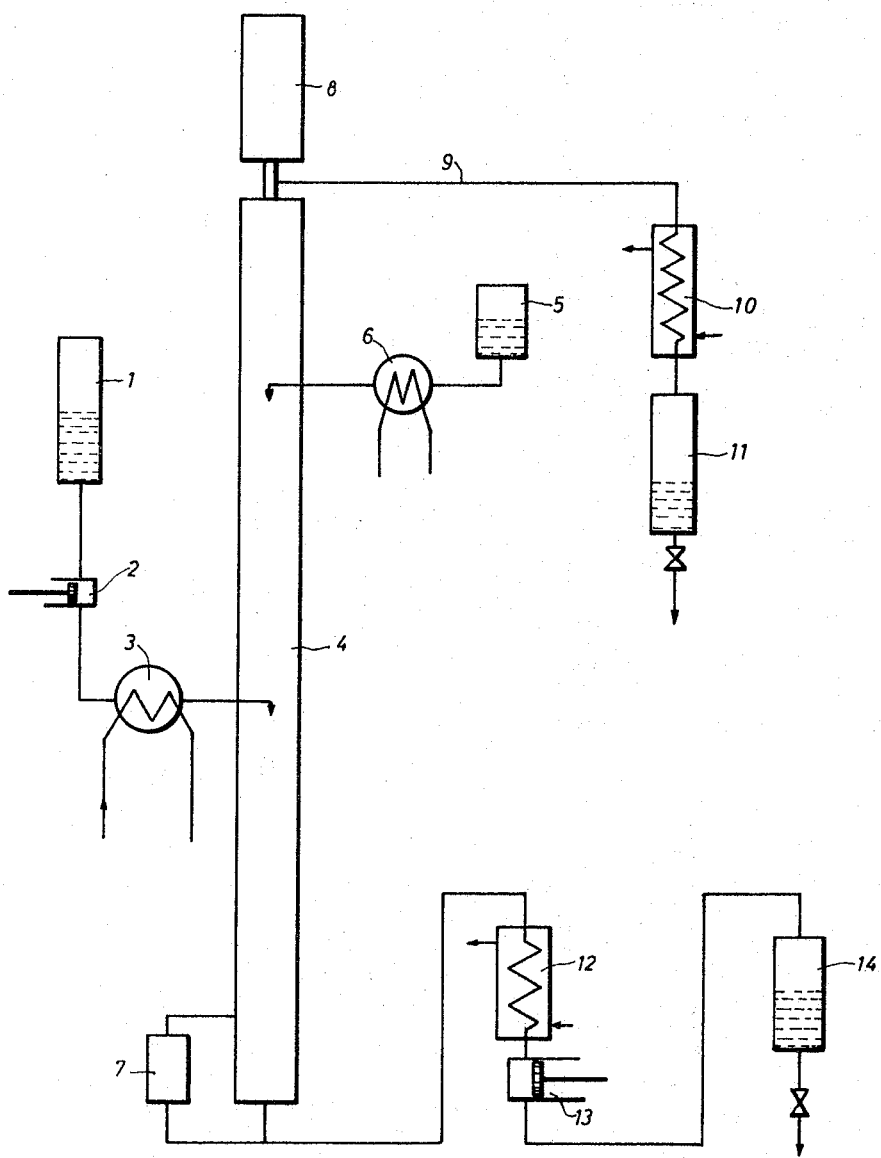

This invention relates to the separation of o-xylene and styrene from mixtures containing both compounds.

It is known that the boiling points of o-xylene and styrene are so close together that separation by simple distillation is practically impossible (o-xylene B.P. 760 mm.: 144.4° C., styrene B.P. 760 mm.: 145.2° C.).

It has now been found that mixtures consisting mainly of o-xylene and styrene can be separated from each other by distillation if the distillation is carried out in the presence of dialkylformamides.

The process according to the invention may be carried out, for example, by introducing the mixture of o-xylene and styrene into a distillation column and introducing all or part of the dialkylformamide into a higher part of the column. However, it is also possible to introduce the dialkylformamide into the column together with the o-xylene-styrene mixture.

As dialkylformamides there are used preferably lower alkylformamides. A particularly suitable dialkylformamide is dimethylformamide, but diethylformamide or monoisopropylmethylformamide may also be used. The dialkylformamides may contain small amounts of water, e.g. 5 to 20%. The dialkylformamide is preferably used in a quantity of 1 part by weight of dialkylformamide to about 0.5 to 2.0 parts by weight of the o-xylene-styrene mixture. The best proportion can easily be determined by preliminary tests. To prevent polymerization of styrene, polymerization inhibitors such as quinone or hydroquinone may be added. p-Tertiary-butylpyrocatechol is particularly advantageous for this purpose.

The o-xylene-styrene mixtures may contain small amounts of other hydrocarbons in addition to the two main components. Such fractions may be obtained, for example, in the distillative separation of hydrocarbons obtained by cracking or pyrolysis, in the pyrolytic splitting of mineral oils, mineral oil fractions or mineral oil residues at temperatures above 600° C. These "cracked gasolines" may be worked up for example by separating the fraction boiling above 125° C., and removing from this fraction by distillation mainly the ethyl benzene and m- and p-xylene, further distillations producing a fraction consisting mainly of o-xylene and styrene and in addition 5 to 20% of other hydrocarbons, especially non-aromatic hydrocarbons whose boiling points lie in the same region as that of the o-xylene-styrene mixture. The o-xylene-styrene mixtures may, of course, also contain, m- and p-xylene which then have to be removed from o-xylene, e.g. by distillation.

In the process according to the invention ahead product is obtained which contains smaller quantities of dialkyl formamide. This dialkylformamide can be removed by washing with water. The process according to the invention may be carried out batchwise or preferably continuously.

*Example 1*

In the following example, taken in connection with the accompanying drawing, a mixture consisting of 50% of xylene and 50% of styrene was subjected to a continuous distillation in the presence of dimethylformamide. The o-xylene-styrene mixture was inhibited with 0.1% by weight p-tertiary-butylpyrocatechol. The distillation column 4 was 2.5 m. long, had an internal diameter of 30 mm. and was filled with wire mesh pieces measuring 3 x 3 mm. The o-xylene-styrene mixture from container 1 was introduced via pump 2 into the column 4 at a height of 1 m. and the dimethylformamide from container 5 was introduced into the column at a height of 2 m. The product could be removed from the sump of the column by a piston pump 13 by way of a cooler 12 and stored in container 14. Before the o-xylene-styrene mixture and the dimethylformamide were introduced into the column, they were heated in preheaters 3 and 6, respectively, to the temperature measured at the points of entry in the column and they were then added dropwise, each at the rate of 50 cc. per hour. The column was heated by the circulation heater 7. An o-xylene fraction containing dimethylformamide was removed from the top of the column at reflux condenser 8 via line 9, liquified in condenser 10, and stored in container 11, while the mixture of dimethylformamide and styrene was removed from the sump via said cooler 12 by pump 13. The distillate and the sump product were freed from dimethylformamide by shaking with water and were then analyzed. The experiment was carried out at 50 mm. Hg and a reflux ratio of 1:15.

Table 1 gives the hourly quantities of o-xylene-styrene mixture, dimethylformamide, product from the top of the column, sump product, their temperatures and composition. Table 2 shows a balance of the continuous distillation test.

Similar results are obtained by using, instead of dimethylformamide, diethylformamide or isopropylmethyl formamide.

TABLE 1.—DISTILLATION CONDITIONS

|  | Quantity cc./h. | T, °C. | Composition | |
|---|---|---|---|---|
|  |  |  | o-Xylene, percent | Styrene, percent |
| o-Xylene/styrene mixture | 50 | 68–69 | 50 | 50 |
| Dimethylformamide | 50 | 63–64 |  |  |
| Product from head of distillation column | 30–35 | 61–62 | 97–100 | 0–3 |
| Sump product | 60–70 | 76–77 |  | 100 |

TABLE 2.—BALANCE FOR 24 HOURS

|  | Quantity g. | o-Xylene, g. | Styrene, g. | o-Xylene | Styrene |
|---|---|---|---|---|---|
|  |  |  |  | In percent calculated on the quantity of o-xylene or styrene contained in the starting mixture | |
| Product put into the reaction (o-xylene/styrene mixture) | 1,060 | 530 | 530 | 100 | 100 |
| Product at the head of distillation column | 543 | 530 | 13 | 100 | 2.5 |
| Sump product | 517 |  | 517 |  | 97.5 |

Example 2

In the following example, an o-xylene-styrene mixture was subjected to distillation in the presence of dimethylformamide. A synthetic o-xylene-styrene mixture containing 42.2% by weight of o-xylene and 57.8% by weight of styrene and inhibited with 0.1% of p-tertiary-butyl pyrocatechol was used as starting material. This o-xylene-styrene mixture was mixed in the ratio of 1:1 with dimethylformamide and charged into the sump of a distillation column which had a length of 2.5 m., an internal diameter of 30 mm. and was filled with pieces of wire mesh measuring 3 x 3 mm. In addition, it was possible to introduce dimethylformamide at a height of 1 m. into the column. The dimethylformamide that was introduced into the column through this tube was first heated to the temperature in the column at the point of inlet before it was introduced into the column. The aforementioned mixture of o-xylene, styrene and dimethylformamide was charged into the sump and distillation was carried out intermittently. 8 fractions were removed from the top of the column; their boiling ranges are given in Table 3 below. Dimethylformamide was added dropwise through the inlet at the height of 1 m. in the column, at a rate bearing a definite relationship to the quantity of distillate removed. This ratio is also given in Table 3. Table 3 further contains the composition of the distillate of each fraction and at the end it gives the numbers showing how much of the o-xylene or styrene that was contained in the original material is contained in each fraction of the distillate. Dimethylformamide was removed from the distillate in each case by shaking with water and the distillate was then analyzed by gas chromatography.

As shown in Table 3, 75% of the o-xlyene contained in the original mixture is present in the first three fractions, but these three fractions of distillate contain only 3.15% of the styrene present in the original mixture. The 8th fraction contains over 70% of the styrene and only 2% of the o-xylene.

TABLE 3

| | Fractions | | | | | | | |
|---|---|---|---|---|---|---|---|---|
| | 1 | 2 | 3 | 4 | 5 | 6 | 7 | 8 |
| Boiling range, $Bp_{50\ mm}$ ° C | 59.0-61.3 | 61.3-62.5 | 62.5-62.8 | 62.8-63.5 | 63.5-64.0 | 64.0-64.5 | 64.5-65.0 | >65.0 |
| Ratio of dimethylformamide added dropwise: quantity of distillate removed in g | 12.7:1 | 3.6:1 | 5.5:1 | 3.9:1 | 3.4:1 | 5.3:1 | | |
| Composition of distillate: | | | | | | | | |
| o-Xylene, percent | 99 | 96 | 88 | 68 | 50 | 30 | 14 | 2 |
| Styrene, percent | 1 | 4 | 12 | 32 | 50 | 70 | 86 | 98 |
| Quantity of o-xylene or styrene in percent in the distillate of the fraction, calculated on the quantity of o-xylene or styrene contained in the starting mixture: | | | | | | | | |
| o-Xylene, percent | 6.4 | 53.7 | 15.1 | 9.9 | 3.3 | 5.5 | 1.6 | 2.0 |
| Styrene, percent | 0.05 | 1.6 | 1.5 | 3.4 | 2.4 | 9.3 | 7.0 | 71.1 |

I claim:
1. Process for separating o-xylene and styrene from mixtures consisting mainly of o-xylene and styrene, which comprises distilling such o-xylene-styrene mixture in the presence of a di-lower-alkyl formamide and recovering o-xylene as distillate.
2. Process according to claim 1 wherein dimethylformamide is used as the di-lower-alkyl formamide.
3. Process according to claim 1 wherein diethylformamide is used as the di-lower-alkyl formamide.
4. Process according to claim 1 wherein the distilling is carried out in a distillation column such that hydrocarbon vapors ascend from such o-xylene-styrene mixture during the distilling and the di-lower-alkyl formamide is passed in countercurrent flow to such ascending hydrocarbon vapors.
5. Process according to claim 1 wherein said di-lower-alkyl formamide is used in a quantity of 1 part by weight per 0.5 to 2.0 parts by weight of the o-xylene-styrene mixture.
6. Process according to claim 1 wherein the distilling is carried out in the presence of a styrene polymerization inhibitor.
7. Process according to claim 1 wherein the distilling is carried out in a distillation column such that the o-xylene ascends to and is recovered as distillate from the head of the column while the styrene settles in and is recovered as residue from the sump, with attendant di-lower-alkyl-formamide being removed correspondingly from the distillate and from the residue by washing with water.

References Cited
UNITED STATES PATENTS

| | | | |
|---|---|---|---|
| 2,380,019 | 7/1945 | Bloomer | 203—53 |
| 2,467,197 | 4/1949 | Engel | 203—60 |
| 2,957,811 | 10/1960 | Geiser | 203—60 |

NORMAN YUDKOFF, Primary Examiner.